Oct. 9, 1956 — C. C. FIFER — 2,765,567
FISH LURE RETRIEVER
Filed Jan. 27, 1956

INVENTOR.
CHARLES C. FIFER
BY
McMorrow, Berman + Davidson
ATTORNEYS

United States Patent Office 2,765,567
Patented Oct. 9, 1956

2,765,567

FISH LURE RETRIEVER

Charles C. Fifer, Dallas, Tex.

Application January 27, 1956, Serial No. 561,720

4 Claims. (Cl. 43—17.2)

This invention relates to retrievers for snagged fishing lures, baits, hooks, or like. More particularly, the invention has reference to a device adapted to be shifted along a fishing line to the location at which a lure is snagged upon an underwater obstruction, with the device being particularly adapted for dislodging the lure so that the lure can be retrieved.

One object is to form the retriever with a body portion having a nose so shaped so as to permit it to be brought forcibly against the snagged lure for dislodging the same.

Another object is to permit attachment of a plate to the nose end of the body portion should the lure be particularly difficult to dislodge, with the plate means being specially shaped to engage a hook or hooks provided on the lure, so that on retrieving of the device the lure will be pulled therewith to the surface.

Still another object is to provide a fish lure retriever, of simple design, adapted for manufacture at low cost and having no relatively moveable parts.

Other objects will appear from the following description, the claims appended thereto, and from the annexed drawing, in which like refeernce characters designate like parts throughout the several views, and wherein:

Figure 1:
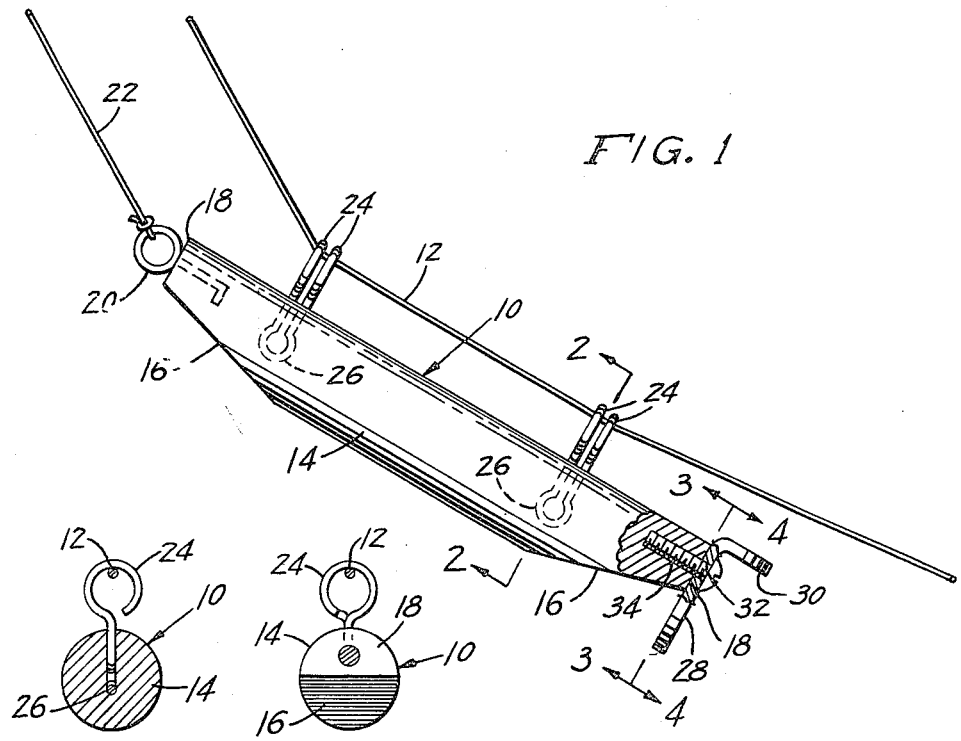
Figure 1 is a side elevational view of a lure retriever formed according to the present invention, a part of the device being shown in longitudinal section.
Figure 2:
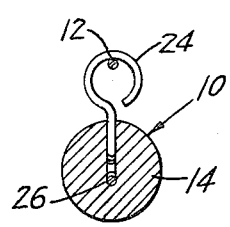
Figure 2 is a transverse sectional view on line 2—2 of Figure 1.
Figure 3:
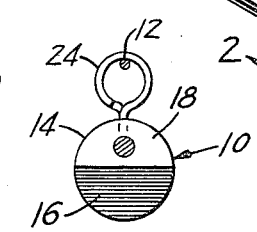
Figure 3 is a transverse section on line 3—3 of Figure 1.
Figure 4:
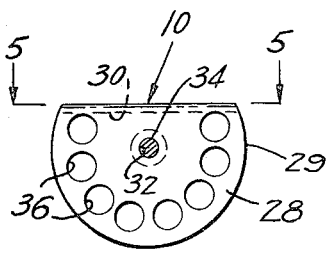
Figure 4 is a transverse section on line 4—4 of Figure 1.
Figure 5:
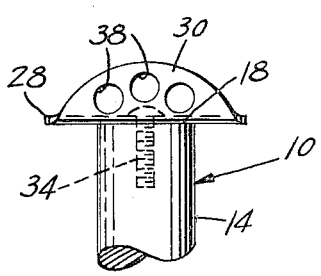
Figure 5 is a fragmentary top plan view of the nose end of the lure as seen from the line 5—5 of Figure 4.

The lure retriever 10 constituting the present invention is shown in association with a conventional fishing line 12 to which is connected a fishing lure, not shown, snagged upon an underwater obstruction. The device includes an elongated body portion 14 solidly formed, so as to be weighted and thereby slide freely by gravity along a fishing line to the location of the snagged lure. The body portion 14 is of circular cross section at its intermediate portion, but at its end is cut away obliquely at its underside as at 16 so as to taper the retriever toward its respective ends. The end surfaces 18 of the body portion are flat, and lie in planes normal to the length of the body portion.

Secured fixedly to the trailing end of the body portion is an eye 20 to which is connectible a retrieving line 22. Spaced longitudinally of the body portion and projecting upwardly therefrom are guides 24 receiving fishing line 12, said guides being disposed in pairs with the guides of each pair having their shanks integrally connected to a part-circular bight portion 26 embedded or otherwise fixedly engaged in the body portion.

Under some circumstances, the device formed as described above will be effective to dislodge the snagged lure. In use under these circumstances, the device is allowed to slide freely along line 12 to the lure, and the tapered nose at the leading end of the body portion will strike the lure to dislodge the same. It may be necessary under some circumstances to pull back on the body portion slightly and then release it, with this operation being repeated a number of times so that the device will strike the lure a corresponding number of times to effect disengagement of the lure from the underwater obstruction.

Under other circumstances, the attachment of a plate 28 to the nose end of the body portion may be necessary. Plate 28 includes a main part 29 lying in a plane normal to the length of the body portion, and a flange 30 projecting forwardly from the top edge of the main part in a plane perpendicular to that of the main part. Plate 28 may originally be a flat disc, which is bent along a line extending chordally thereof to define the main part and flange.

The disc of which the main part and flange are formed has a center opening 32 and a screw 34 is extendable through said center opening and is engageable in a threaded recess of the nose of the body portion.

The disc has a marginal, continuous series of apertures, and on bending of the disc some of said apertures, designated at 36, are arranged as an arcuate series along the edge of the main part, with the remaining apertures 38 extending as an arcuate series along the forwardly projecting, curved edge of flange 30.

When the plate is brought against the lure, the hook or hooks of the lure are engageable in the openings 36 or 38, to connect the lure to the body portion, after which a pull on the body portion through the medium of line 22 will cause the lure to be dislodged and brought to the surface with the body portion.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A fish lure retriever comprising a body portion; plate means on one end of said body portion having a series of openings for engagement of a hook of a snagged fish lure on movement of the body portion to a location adjacent said lure; guides on the body portion adapted to loosely receive a fishing line, whereby said body portion may slide freely along the line in one direction to the lure to be retrieved; and means at the other end of the body portion for connecting a second line thereto, to pull the body portion in an opposite direction.

2. A fish lure retriever comprising a body portion; a plate secured to one end of the body portion and having a main part lying in a plane normal to the length of the body portion and formed with an arcuate series of openings for receiving a hook of a snagged lure; guides on the body portion adapted to loosely receive a fishing line, whereby said body portion may slide freely along the line in one direction to the lure to be retrieved; and means at the other end of the body portion for connecting a second line thereto, to pull the body portion in an opposite direction.

3. A fish lure retriever comprising a body portion; a plate secured to one end of said body portion and having a main part formed with an arcuate series of openings adapted to receive a hook of a snagged lure on movement of the body portion adjacent said lure, said plate including a flange projecting forwardly from the main part and lying in a plane normal to the plane of the main part, said flange having a second series of openings adapted to receive said hook; guides on the body portion adapted to loosely receive a fishing line, whereby said body portion may slide freely along the line in one direction to the lure to be retrieved; and means at the other end of the body portion for connecting a second line thereto, to pull the body portion in an opposite direction.

4. A fish lure retriever comprising a body portion of elongated formation; a plate secured to one end of the body portion and including a main part and a flange projecting forwardly from the main part, said main part and flange being formed as a disc bent along a line extending chordally thereof with the flange and main part being disposed in perpendicularly related planes, said disc including a marginal, continuous series of apertures some of which are formed in the flange with the remaining apertures being formed in the main part, said apertures being adapted to receive a hook of a lure to be retrieved on movement of the body portion adjacent said lure; guides spaced longitudinally of and projecting upwardly from the body portion adapted to loosely receive a fishing line, whereby said body portion may slide freely along the line in one direction to the lure to be retrieved; and means at the other end of the body portion for connecting a second line thereto, to pull the body portion in an opposite direction.

References Cited in the file of this patent
UNITED STATES PATENTS 2,609,632     Davis _____ Sept. 9, 1952